Oct. 6, 1953 — L. J. FULLER — 2,654,538
INSTRUMENT FOR DETERMINING MOTOR VEHICLE ACTION
Filed June 3, 1952 — 2 Sheets-Sheet 1
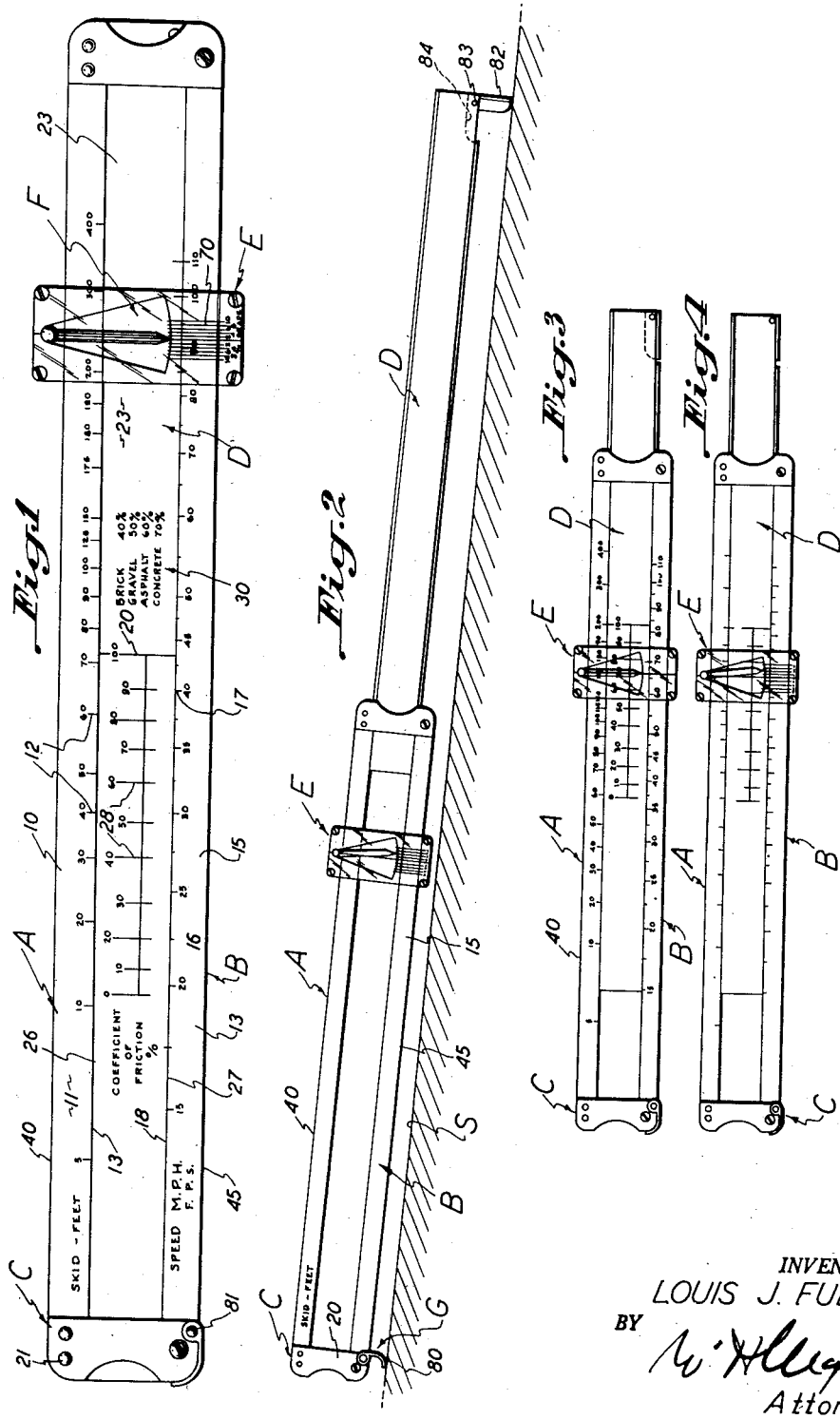
INVENTOR.
LOUIS J. FULLER.

Oct. 6, 1953          L. J. FULLER          2,654,538
INSTRUMENT FOR DETERMINING MOTOR VEHICLE ACTION
Filed June 3, 1952                           2 Sheets-Sheet 2
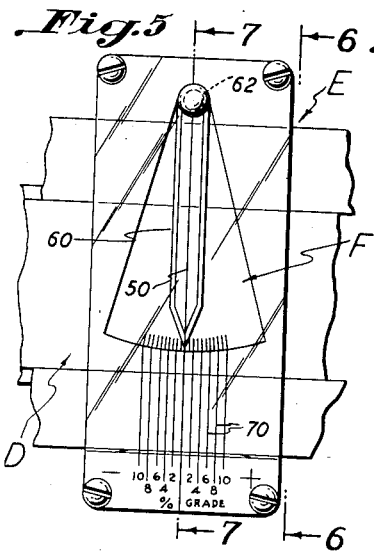
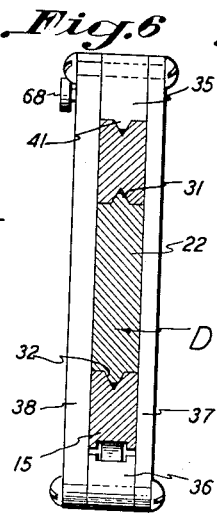
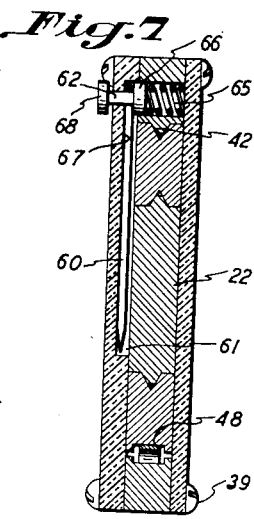
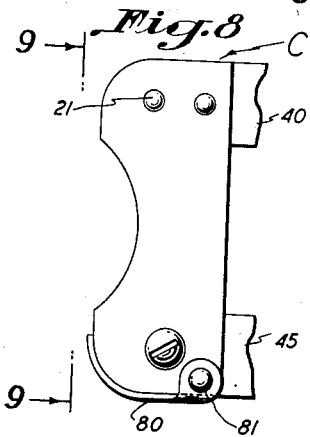
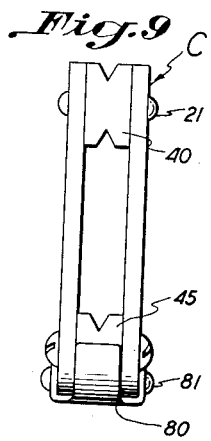
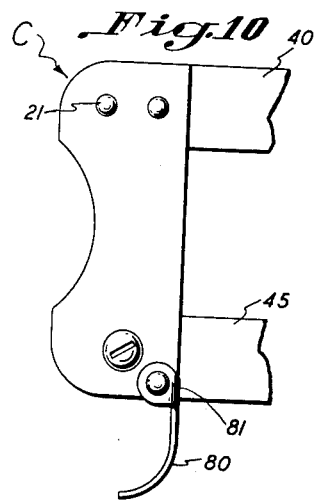
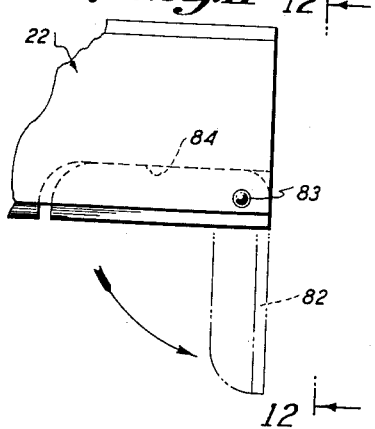
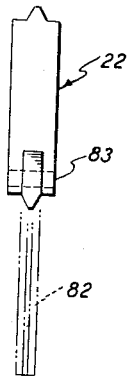
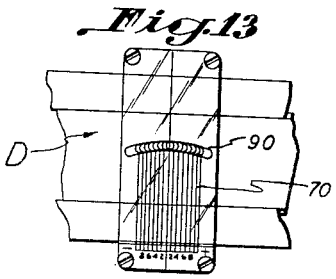
INVENTOR.
LOUIS J. FULLER.
BY
Attorney.

Patented Oct. 6, 1953

2,654,538

UNITED STATES PATENT OFFICE 2,654,538

INSTRUMENT FOR DETERMINING MOTOR VEHICLE ACTION

Louis J. Fuller, Los Angeles, Calif.

Application June 3, 1952, Serial No. 291,440

9 Claims. (Cl. 235—61)

This invention has to do with an instrument for determining motor vehicle action and it is more particularly concerned with a device or instrument for use when certain factors incidental to the action or performance of a vehicle are known and it is desired to ascertain a fact that is unknown. It is a general object of the present invention to provide a simple, practical, easily operated instrument or machine that can be operated quickly and accurately to ascertain the answer to most problems that arise concerning motor vehicle actions or performance when vehicles are involved in accidents.

Motor vehicles, such as automobiles, operated over modern highways are, from time to time, involved in accidents following which it is often necessary and highly desirable to ascertain with reasonable accuracy an unknown or disputed fact from a consideration of known factors. In a typical and most usual situation a vehicle involved in an accident leaves a skid mark of a measurable or known length on a pavement of known character and pitch. The factor unknown or in dispute in such case is usually the speed of the vehicle at the time the skid mark started. It is possible for a person skilled in the solution of such problems to employ certain mathematical formulas and to make certain calculations and possibly some reasonable assumptions and then give an answer or opinion which is reasonably accurate. Such persons are not always available and it is not always possible to contact them, and therefore an unknown fact, such as I have referred to, may be the subject of lengthy debate or controversy, or it may never be ascertained with sufficient accuracy to make possible a proper or equitable solution of a controversy. It is, of course, obvious that the ascertaining of a fact such as the one mentioned from factors such as those that I have pointed out is frequently the subject of legal controversy and is one that is commonly sought by persons engaged in law enforcement and in the handling or settling of insurance claims, etc.

It is an object of this invention to provide an instrument of simple, practical form and which is such that it can be easily and accurately operated and which involves scales representing factors incidental to automobile performance and related so that with certain known factors available an unknown fact can be accurately ascertained.

It is a general object of this invention to provide an instrument of the general character referred to which includes or requires but few simple, relatively movable parts, making the instrument simple and inexpensive of manufacture and simple and convenient to use.

It is another object of this invention to provide an instrument of the general character referred to such that a substantial number of important or frequently occurring problems incidental to motor vehicle operation can be solved without resort to calculations or mental operations likely to result in errors or mere approximations.

It is another object of this invention to provide an instrument of the general character referred to which is of such simple construction, and of such simple character, generally, as to make possible quick, accurate operations by persons unskilled or untrained in the handling of mathematical problems and who are ordinarily not qualified to solve problems or express opinions in situations where several factors are known and a critical fact is to be ascertained therefrom.

The instrument provided by the present invention is characterized by two elongate, rigid, main scales, connected by a coupling means so that they are maintained in spaced parallel relationship. Markings or graduations on one main scale may represent a value such as speed. An intermediate or working scale is provided and is slidably supported between the main scales, and in accordance with the present invention it has a reference mark cooperatively related to the markings occurring in the main scales, and it bears a series of marks or graduations extending lengthwise of it and from the reference mark and representing factors, as for instance, frictional characteristics of different pavements or surfacings. A slide, or scale coordinator cooperates with the several scales and is shiftable or movable lengthwise of the instrument and relative to the scales. The slide bears an indicating mark and a pitch indicating means is provided on or is carried by the slide. The pitch indicating means involves a gravity actuated element and a series of graduations or markings with which the gravity actuated element cooperates so that if the instrument is placed on a pavement the pitch or inclination of the pavement results in positioning of the gravity actuated element so that a reading is ascertained whereby that factor is taken into account as the instrument is read. In a typical form of the invention pavement engaging elements or feet are provided on the structure, preferably at opposite ends thereof, and when the feet are in operating position they depend and are adapted to be engaged with the pavement, the pitch or inclination of which is to be determined.

The various objects and features of my invention will be fully understood from the following detailed description of typical preferred forms and applications of the invention, throughout which description reference is made to the accompanying drawings, in which:

Fig. 1 is a face view of the instrument provided by the present invention, showing it unactuated or in a form in which it may be readily handled or stored. Fig. 2 is a view of the instrument on a scale reduced from that shown in Fig. 1, and showing the relatively movable scales extended and the feet of the instrument depending and in engagement with a surface or pavement. Fig. 3 is a view illustrating the instrument in a typical setting or position in which it occurs when it is positioned to be read, the pitch or inclination indicating element being in a position indicating that the surface of the pavement previously engaged is of zero pitch or inclination. Fig. 4 is a view similar to Fig. 3 showing the instrument in a corresponding setting or position but with the pitch or inclination indicating element showing a substantial inclination or pitch from a true horizontal. Fig. 5 is an enlarged face view of a portion of the instrument showing the slide, being an enlargement of a portion of Fig. 1. Fig. 6 is a detailed sectional view taken as indicated by line 6—6 on Fig. 5. Fig. 7 is a detailed sectional view taken as indicated by line 7—7 on Fig. 5. Fig. 8 is an enlarged view of one end of the instrument as shown in Fig. 1. Fig. 9 is an end view of the instrument, being a view taken as indicated by line 9—9 on Fig. 8. Fig. 10 is a view similar to Fig. 8 showing the foot occurring at that end of the instrument down or in working position. Fig. 11 is an enlarged view of the end portion of the instrument shown at the right in Fig. 2, showing the foot shown in the folded position indicated in the down or working position. Fig. 12 is an end view, being a view taken as indicated by line 12—12 on Fig. 11 and Fig. 13 is a reduced view similar to Fig. 5, showing another form of construction.

The instrument as provided by the present invention includes, generally, two elongate main scales A and B and a coupling means C rigidly connecting the main scales and holding them in spaced parallel relationship. An intermediate or working scale D is provided and occurs between the main scale A and B and a slide or scale co-ordinator E is provided and is adapted to be operated lengthwise of the assembled scales A, B and D. A pitch indicating means F is provided and is preferably carried by the slide E and in the preferred construction pavement engaging feet G are provided at the ends of the instrument.

The main scale A preferably involves a simple straight, elongate body 10 which is rigid and which has a front face 11 bearing a series of markings or graduations 12. The markings or graduations 12 preferably occur on the face 11 adjacent the edge 13 which opposes scale B and in the case illustrated they represent values of a particular factor, namely, distance, and in practice it is convenient that they represent such values in terms of feet.

The main scale B is similar, generally, to the main scale A, in that it has an elongate, straight, rigid body 15 with a front face 16 bearing a series of markings or graduations 17. The markings or graduations 17 occur on face 15 adjacent the edge 18 of the scale B opposing the scale A. The graduations or markings 17 represent values of a particular factor, namely, speed, and in the case illustrated they represent this factor in terms of miles per hour. It is to be understood, of course, that if desired this factor can be represented in terms of feet per second, or if desired both such systems of graduations can be incorporated simultaneously on the face 16.

The coupling means C connects the scales A and B together in fixed spaced parallel relationship, as shown throughout the drawings. In the particular construction illustrated the means C includes spaced coupling plates 20 at each end of the assembly formed by the scales A and B and these plates are connected or made fast to the end portions of the scales A and B by suitable fasteners 21.

The intermediate or working scale D is cooperatively related to the main scales A and B and is preferably supported by and between the main scales A and B. In its preferred form the scale D has a simple straight rigid body 22 with a front face 23 flush with or in the plane of the faces 11 and 16 of scales A and B, respectively. The scale D is provided with or characterized by a transverse reference mark 20 which is preferably such as to extend between the upper and lower edges 26 and 27, respectively, of the face 23 so that this mark can be readily positioned for accurate reading with reference to the markings 17 on scale B.

In accordance with the present invention the scale D is provided with markings or graduations 28 in a series related to or extending lengthwise of the body 22 from the reference mark 20 and in the same direction to that in which the markings on the scales A and B progress. The markings 28 represent factors such as coefficients of friction and in the case illustrated the reference mark 20 is at a point relative to the markings 28 where it represents 100 percent, whereas the markings 28 represent coefficients less than 100 percent, as will be readily understood from an examination of Fig. 1 of the drawings.

In employing the instrument provided by the present invention suitable preliminary tests can be made to ascertain exactly what coefficient of friction factor is to be employed when using the instrument, or for ordinary practical results it can be assumed that a particular pavement or surface that is known and which is involved in the problem has a recognized or known coefficient of friction. For example, it is generally recognized, and it has been ascertained by experience or test, that the coefficient of friction to be employed if the pavement involved is brick is 40%, if the pavement involved is gravel it is 50%, if the pavement involved is asphalt it is 60% and if the pavement is concrete it is 70%. For convenient reference it is preferred that a table of such factors be provided on the face 23 of scale B, as at 30.

In the preferred form of the invention the working scale D is supported by or mounted between the scales A and B to be readily shiftable lengthwise relative to the scales A and B. In the particular case illustrated the body 22 of scale D is provided at its upper and lower edges with longitudinal ribs or rails 31 which are slidably carried in grooves 32 provided in the opposing edges of scale bodies 10 and 15, respectively.

The scale coordinator or slide E is carried by the assembly of scales A, B and D and in the form illustrated it involves an upper block 35, a lower block 36, a back plate 37 and front plate 38.

These several parts are held in a rigid assembly by suitable fasteners 39. The top or upper block 35 is slidably engaged with the top edge 40 of the body 10 of scale A and in the case illustrated the block 35 has a rib or rail 41 slidably carried in a groove 42 provided in the upper edge 40 of the scale body 10. The block 36 occurs immediately below the lower edge 45 of the body 15 of scale B. A suitable drag or friction element is provided between the block 36 and the scale body 15. In the case illustrated this element is in the form of a drag or friction spring 48 located or confined between the block 36 and the body 15 of scale B.

In accordance with the present invention the front plate 38 of the slide E is transparent, or at least has a transparent portion, and at that point an indicating mark 50 is provided, as clearly illustrated in Fig. 5 of the drawings. The indicating mark extends transversely of the instrument, that is, it is provided on the slide E so that it extends transversely of the scales A, B and D, and it is of such extent as to overlie the markings occurring on the scales A, B and D.

The pitch indicating means F in the form of the invention illustrated in Figs. 1 to 12, inclusive, is characterized by a gravity actuated element in the form of a pendulum or pointer 60. The pointer is located in a suitable cavity 61 provided in the inner side of the front plate 38 so the cavity opposes the front faces 11 and 23 of the scales A and D, respectively. A pivot pin 62 is carried by the slide to extend through the upper portion of the cavity 61 and the pointer 60 is pivotally carried by the pin 62. The axis of pin 62 is normal to the plane in which the faces 11, 15 and 23 occur.

In the construction illustrated a lock means is provided normally holding the pointer against pivotal movement, and this means includes a spring 65 carried in the top block 35 of slide E and normally bearing against a flange 66 on the pivot pin 62 so that the flange 66 holds the pointer tight against the wall 67 of the cavity 61. The pivot pin projects from the front plate 38 of slide E and is provided with an operating knob 68. When the knob 68 is depressed the pressure on the pointer is released so that the pointer is moved by gravity into a truly perpendicular position.

In accordance with the invention markings 70 are provided on the plate 38 in series extending in each direction or from each side of the indicating mark 50, as clearly shown in Fig. 5 of the drawings, and these markings 70 are preferably spaced to give readings of inclination in terms or degrees or percentage, the markings to one side of the indicating mark indicating a minus or down grade inclination and those on the other side indicating a plus or up grade inclination.

The pavement engaging elements G provided by the invention are preferably in the nature of feet provided at opposite ends of the instrument, as hereinabove described. In the preferred form of the invention there is a foot 80 at one end of the instrument, say, for instance, at the lefthand end of the instrument where it is carried by a pivot pin 81 supported by the end portion of the main scale B. The foot 80 is operable between a normally collapsed or folded position such as shown in Figs. 1 and 8, where it fits close to or possibly partly around the end portion of scale B, and a working or depending position such as is shown in Fig. 10, where it projects down and is adapted to engage the surface S of a pavement, as shown in Fig. 2.

The other foot 82 is carried by a pivot pin 83 supported by the end portion of scale D at the end of the instrument opposite that where foot 80 is located. The foot 82, when in an up or folded position, enters a suitable recess or socket 84 provided in the end portion of scale body 22, and when it is down or in the depending or working position it is adapted to engage the surface S of the pavement in the manner indicated in Fig. 2 of the drawings.

Through the construction just described the depending feet of the instrument can be engaged with the surface S at points spaced a substantial distance apart, with the result that an accurate grade reading is obtained and the feet are of such extent as to support the instrument in the manner shown in Fig. 2, with the slide E spaced from the surface S to be clear thereof.

In the form of the pitch indicating means shown in Fig. 13 of the drawings the gravity actuated element is in the nature of a spirit level, there being liquid carried in an arcuate chamber 90 provided in the front plate 38 of the slide and a bubble occurs in the liquid. It will be immediately apparent that gravity acts on the liquid in the cavity 90 to locate the bubble in a manner analogous to its operation on the pointer 60, as hereinabove described.

With the instrument provided by the present invention a number of problems can be readily, accurately and fully solved, as where two or three factors are known and it is desired to ascertain a fact that can be mathematically determined from those factors. In other cases the instrument can be used to ascertain a factor that can be employed in making various calculations. No attempt will be made here to explain the numerous manners in which the instrument can be operated in the solving of problems or in ascertaining factors, since it is believed that the following simple examples will serve as an adequate basis for understanding the invention.

In a typical situation, as, for instance, where there has been a usual type of automobile accident, there is a skid mark of a particular length on a pavement at a particular location. It is possible and obviously a very simple matter to measure the length of the skid mark. The operator of the present instrument may extend the feet of the instrument to working position and if he so desires he may extend the scale D at a substantial distance to the right relative to the scales A and B, and then contact the pavement where the skid mark occurs with the feet placing the instrument lengthwise of the skid mark and releasing the lock means of the pointer 60. When the pointer is at rest the lock means is allowed to engage, setting the pointer in a position corresponding to the pitch or inclination of the pavement, as for example, in the position shown in Fig. 4 of the drawings.

With the length of the skid mark known, the operator of the instrument then moves the working scale D to a position where the reference mark 20 comes opposite the reading on the scale A corresponding to the length of the skid mark. The character of the pavement is of course readily ascertainable as by observation, and the operator of the instrument with this fact known moves the slide E relative to the scale D until the marking on the slide E designated by the pointer 60 is in register with the marking 28 occurring on scale D and designating the coefficient of friction factor corresponding to such surface. As for example, if the surface of the pavement is asphalt the mark designated on the slide E is moved into register with the mark designated 60 on the scale D. The mark indicated or designated on scale E, as by the pointer 60 when thus registered with the proper marking on scale D is read with reference to the markings 17 on scale B, giving the operator a reading in speed or miles per hour at which the vehicle was moving when the skid mark started.

In another case, for example, it may be assumed that the skid mark occurring on a level pavement of asphalt is 112.5 feet long. The operator in this case will first set scale D so that the reference mark 25 is at 112.5 on scale A. He will then move the slide E to bring the indicating mark 50 on the slide E in register with the mark 60 occurring on slide D, whereupon the mark 50 read on scale B gives the answer; namely, that the speed of the vehicle when the skid mark started was 45 miles per hour.

As an example of another manner in which the instrument may be operated, it may be assumed that the speed of the vehicle is 45 miles per hour, that the pavement is asphalt and level, and it is desired to know how long the skid mark will be in such a situation. In this case the operator of the instrument may set the slide E with the indicating mark 50 at 45 on scale B and then position scale D with marking 60 in register with the indicating mark 50, whereupon the reference mark 25 will read at 112.5 on scale A, thus giving the length of the skid mark as 112.5 feet.

It is, of course, to be understood that in carrying out the present invention the series of markings provided on the scales are related or so laid out as to represent values on a basis or in such relationship as to give the answer to problems worked as above pointed out.

From the foregoing description it will be apparent that the instrument as provided by the present invention is simple of construction and operation, that assuming the instrument has been constructed with the scales accurately related, the readings obtainable are accurate. It is to be observed that the folding feet provided on the instrument make possible convenient handling or storage of the instrument and it is notable that the pitch indicating means, when employed, serves, in effect, to take into account or make correction for pitch of the pavement.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. An instrument of the character described including, two straight rigid elongate scales with bodies established in spaced parallel relationship, one a main scale having markings in an elongate series and representing values of distance and the other a main scale having markings in an elongate series and representing values of speed, an elongate rigid working scale with a body slidable between the main scales and parallel therewith and having markings in an elongate series and including a reference mark cooperatively related to the markings on the main scales and having markings in a series longitudinal of the working scale and representing values of friction coefficient, and a slide movable longitudinally relative to said scales and having an indicating mark cooperatively related to the markings on each of said scales and having markings in a series extending from the indicating mark lengthwise of the scales and representing values of a factor modifying the coefficient of friction.

2. An instrument of the character described including, two straight rigid elongate scales with bodies established in spaced parallel relationship, one a main scale having markings in an elongate series and representing values of distance and the other a main scale having markings in an elongate series and representing values of speed, an elongate rigid working scale with a body slidable between the main scales and parallel therewith and having markings in an elongate series and including a reference mark cooperatively related to the markings on the main scales and having markings in a series longitudinal of the working scale and representing values of friction coefficient, and a slide movable longitudinally relative to said scales and having an indicating mark cooperatively related to the markings on each of said scales and having markings in series extending lengthwise of the scales in both directions from the indicating mark and representing values of variation from a horizontal plane.

3. An instrument of the character described including, two straight rigid elongate scales with bodies established in spaced parallel relationship, one a main scale having markings in an elongate series and representing values of distance and the other a main scale having markings in an elongate series and representing values of speed, an elongate rigid working scale with a body slidable between the main scales and parallel therewith and having markings in an elongate series and including a reference mark cooperatively related to the markings on the main scales and having markings in a series longitudinal of the working scale and representing values of friction coefficient, a slide movable longitudinally relative to the scales and having an indicating mark cooperatively related to the markings on each of the scales, and pitch indicating means including markings in a series extending longitudinally of the scales and from the indicating mark and a gravity actuated element carried by the slide and cooperatively related to the last mentioned markings.

4. An instrument of the character described including, two straight rigid elongate scales with bodies established in spaced parallel relationship, one a main scale having markings in an elongate series and representing values of distance and the other a main scale having markings in an elongate series and representing values of speed, an elongate rigid working scale with a body slidable between the main scales and parallel therewith and having markings in an elongate series and including a reference mark cooperatively related to the markings on the main scales and having markings in a series longitudinal of the working scale and representing values of friction coefficient, a slide movable longitudinally relative to the scales and having an indicating mark cooperatively related to the markings on each of the scales, and pitch indicating means including markings in a series extending longitudinally of the scales and from the indicating mark and a gravity actuated pivotally mounted indicator carried by the slide and cooperatively related to the last mentioned markings.

5. An instrument of the character described including, two straight rigid elongate scales with bodies established in spaced parallel relationship, one a main scale having markings in an elongate series and representing values of distance and the other a main scale having markings in an elongate series and representing values of speed, an elongate rigid working scale with a body slidable between the main scales and parallel therewith and having markings in an elongate series and including a reference mark cooperatively related to the markings on the main scales and having markings in a series longitudinal of the working scale and representing values of friction coefficient, a slide movable longitudinally relative to the scales and having an indicating mark cooperatively related to the markings on each of the scales, and pitch indicating means including markings in a series extending longitudinally of the scales and from the indicating mark, a gravity actuated pivotally mounted indicator carried by the slide and cooperatively related to the last mentioned markings, and releasable lock means normally holding the indicator against movement relative to the slide.

6. An instrument of the character described including, two straight rigid elongate scales with bodies established in spaced parallel relationship, one a main scale having markings in an elongate series and representing values of distance and the other a main scale having markings in an elongate series and representing values of speed, an elongate rigid working scale with a body slidable between the main scales and parallel therewith and having markings in an elongate series and including a reference mark cooperatively related to the markings on the main scales and having markings in a series longitudinal of the working scale and representing values of friction coefficient, a slide movable longitudinally relative to the scales and having an indicating mark cooperatively related to the markings on each of the scales, and pitch indicating means including markings in a series extending longitudinally of the scales and from the indicating mark and a gravity actuated means including a body of fluid in an arcuate chamber and carrying a bubble cooperatively related to the last mentioned markings.

7. An instrument of the character described including, two straight rigid elongate scales with bodies established in spaced parallel relationship, one a main scale having markings in an elongate series and representing values of distance and the other a main scale having markings in an elongate series and representing values of speed, an elongate rigid working scale with a body slidable between the main scales and parallel therewith and having markings in an elongate series and including a reference mark cooperatively related to the markings on the main scales and having markings in a series longitudinal of the working scale and representing values of friction coefficient, a slide movable longitudinally relative to the scales and having an indicating mark cooperatively related to the markings on each of the scales, and pitch indicating means including markings in a series extending longitudinally of the scales and from the indicating mark, a gravity actuated element carried by the slide and cooperatively related to the last mentioned markings, and feet on the assembly of scales and spaced apart and adapted to engage the surface of a pavement.

8. An instrument of the character described including, two straight rigid elongate scales with bodies established in spaced parallel relationship, one a main scale having markings in an elongate series and representing values of distance and the other a main scale having markings in an elongate series and representing values of speed, an elongate rigid working scale with a body slidable between the main scales and parallel therewith and having markings in an elongate series and including a reference mark cooperatively related to the markings on the main scales and having markings in a series longitudinal of the working scale and representing values of friction coefficient, a slide movable longitudinally relative to the scales and having an indicating mark cooperatively related to the markings on each of the scales, and pitch indicating means including markings in a series extending longitudinally of the scales and from the indicating mark, a gravity actuated element carried by the slide and cooperatively related to the last mentioned markings, and feet on the assembly of scales and spaced apart and adapted to engage the surface of a pavement, one foot being carried by the combined main scales at one end of the assembly of scales and the other foot being carried by the working scale at the other end of the assembly of scales.

9. An instrument of the character described including, two straight rigid elongate scales with bodies established in spaced parallel relationship, one a main scale having markings in an elongate series and representing values of distance and the other a main scale having markings in an elongate series and representing values of speed, an elongate rigid working scale with a body slidable between the main scales and parallel therewith and having markings in an elongate series and including a reference mark cooperatively related to the markings on the main scales and having markings in a series longitudinal of the working scale and representing values of friction coefficient, a slide movable longitudinally relative to the scales and having an indicating mark cooperatively related to the markings on each of the scales, and pitch indicating means including markings in a series extending longitudinally of the scales and from the indicating mark, a gravity actuated element carried by the slide and cooperatively related to the last mentioned markings, and feet pivotally mounted on the assembly of scales at opposite ends thereof and adapted to engage the surface of a pavement.

LOUIS J. FULLER.

References Cited in the file of this patent

UNITED STATES PATENTS

| Number | Name | Date |
|---|---|---|
| 767,170 | Rosenthal | Aug. 9, 1904 |

OTHER REFERENCES

"Special Slide Rules" by J. N. Arnold, published by Purdue University of Lafayette, Indiana, in 1933, as Bulletin No. 32 of the Engineering Extension Department, pages 19–31.